United States Patent Office 3,061,436
Patented Oct. 30, 1962

3,061,436
VINYLSULFONAMIDE MODIFIED GELATINE AND PHOTOGRAPHIC EMULSIONS THEREFROM
Wolfgang Himmelmann, Leverkusen, Harald von Rintelen, Koln-Rodenkirchen, and Ottmar Wahl, Baden-Baden, Germany, assignors to Agfa Aktiengesellschaft, Leverkusen, Germany, a corporation of Germany
No Drawing. Filed Dec. 4, 1959, Ser. No. 857,268
Claims priority, application Germany Dec. 6, 1958
3 Claims. (Cl. 96—94)

This invention relates to protein derivatives and more especially to gelatine derivatives obtained by reacting gelatine with an N-aryl-vinylsulfonamide. Furthermore, this invention relates to photographic layers containing said protein derivatives as a binding agent.

For the production of photographic layers, it is frequently desirable to use layer colloids, the physical properties of which differ from those of the gelatines usually employed in practice. Thus it is advantageous for many purposes to use layer colloids, of which the iso-electric point, the hardening capacity or viscosity differ from those of the gelatine. For this purpose, gelatine and other proteins have already been reacted with numerous compounds. Thus, there are especially known the reaction products of proteins or gelatine with organic carboxylic acid chlorides, carboxylic acid anhydrides, sulphochlorides, isocyanates, diketones, diketenes, and cyclic carboxylic acid imides, as well as the use thereof for the production of photographic layers. Some of these reaction products have the disadvantage, which is important as regards the practical application thereof, that the reactions necessary for their manufacture proceed too slowly. One essential disadvantage which is particularly apparent when producing photographic emulsions is, however, that by-products are formed in the reaction of the proteins with the said reactants, and these by-products can cause a considerable deterioration in the photographic properties if they are not removed. As regards the carboxylic acid chlorides and sulphonic acid chlorides, the hydrochloric acid which is liberted during the reaction can finally result in the degradation of the gelatine.

It has now been found that the aforementioned disadvantages can be obviated if gelatine or another protein is reacted with an N-aryl-vinylsulphonamide, especially with sulphonamides of the general formula

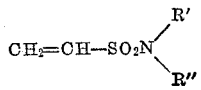

wherein R' represents an aryl radical, such as phenyl or naphthyl, the hydrogen atoms of which may be substituted by alkyl radicals, preferably lower alkyl radicals having 1 to 5 carbon atoms, halogen atoms, such as chlorine or bromine, alkoxy or aroxy radicals, such as methoxy, ethoxy, butoxy, phenoxy, aryl radicals, such as phenyl, or by carboxyl groups, and R'' represents a hydrogen atom, an alkyl radical containing from 1 to 4 carbon atoms or an alkanolyl (R—CO—) radical derived from a carboxylic acid, such as an acetyl (CH$_3$—CO—) radical.

The vinylsulphonamides may be prepared in known manner by reacting an ethaneic, β-disulphonic acid chloride or a β-chroloethane sulphonic acid chloride with an aryl amine.

The particular advantage of the process is that the reaction of the proteins with the vinylsulphonamides is a simple addition reaction of the free amino groups of the protein to the double bond of the vinylsulphonamides and consequently no by- or secondary products are formed in the reaction. The reaction is illustrated by the following equation:

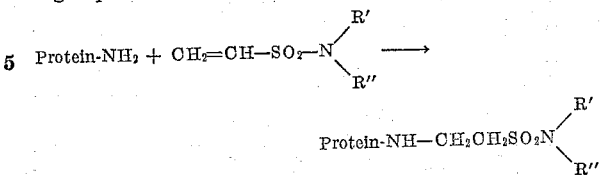

In carrying out the reaction of the protein or the gelatine with the vinylsulphonamides, an aqueous alkaline or methanolic solution of the vinylsulphonamide which may be adjusted to a pH value of about 7.5 to 10 by means of caustic soda or caustic potash is run into an about 5 to 15% aqueous gelatine solution having a pH value of from 8 to 10 at about 35 to 55° C., preferably 40 to 50° C., and stirred for about 10 to 120 minutes. In contrast to the prior known reactions, a readjustment of the pH value is not necessary. It is an additional advantage of the process that it is possible to work without an excess of the vinylsulphonamide. The vinylsulphonamide is applied in quantities varying between about 2 to 20, preferably 5 to 15 parts by weight per 100 parts by weight of gelatine or other protein.

The gelatine derivatives obtained by the reaction with said vinylsulphonamides are sparingly soluble or insoluble in water in the pH range from 2.5 to 4.5. Gelatine treated in this manner can thus be dissolved in a strongly acid range, in a neutral range and in an alkali range and can be precipitated in the pH range from 2.5 to 4.5. This fact is of especial importance for the production of photographic gelatine-silver halide emulsions, since the reaction may be carried out prior to or following the precipitation of silver halide and the gelatine-silver halide emulsion may be precipitated by suitable adjustment of the pH. By adjustment to higher pH values, the emulsions thus precipitated may be dissolved in water again after decanting off the solution containing the excess salts and may be cast in the usual manner. The photographic emulsions produced in this way show a lower tendency to fogging while having the same sensitivity as the emulsions produced with the original gelatine.

An additional advantage which is of great significance, especially as regards casting, of the gelatine or other proteins reacted with vinylsulphonamides is that the viscosity of the reaction products may be modified by altering the pH value When using the proteins reacted with vinylsulphonamides as binding agents for photographic silver halide emulsions they may be used in admixture with additives usual in the emulsion art, such as sensitizing dyestuffs, stabilizers, hardeners, wetting agents, dyestuff components and the like.

It is also possible to produce layers without silver halide, for example filter layers, protective layers and separation layers from the gelatine derivatives by themselves or in combination with gelatine or film-forming gelatine substitutes as they are customary in the art, such as polyvinylalcohol, polyacrylic acid, and polyacrylamide.

Other proteins, such as caseins, albumins and the like may be used instead of gelatine.

*Example 1*

1 kg. of gelatine is swelled and dissolved in 10 litres of water. 50 g. of vinyl sulphonic acid anilide (prepared according to the instructions in Ber. 36, page 3629 (1903)) dissolved in dilute sodium hydroxide solution, are added to the gelatine solution all at once.

The mixture is adjusted to a pH value of 9 and heated to 45° C. The solution is stirred for 2 hours and neutralized. After solidification, the gel is comminuted, rinsed and dried. The derivative is soluble in water in the pH ranges 5 to 11 and 2 to 1.

*Example 2*

1 kg. of gelatine is swelled and dissolved in 10 litres of water and after it dissolves, is reacted with 80 g. of N-acetyl-vinyl sulphonic acid toluidide, prepared according to the instructions in J. Chem. Soc., 1945, page 465. The procedure is as follows:

The compound is dissolved in acetone and it is added dropwise into the gelatine solution, which is adjusted to a pH value of 9 and heated to 45° C. After stirring for 2 hours at a pH value of 9 and at a temperature of 45° C., there is obtained a gelatine derivative which is either coagulated at pH 3.8 or can be solidified in the usual manner after neutralization.

*Example 3*

An aqueous alkaline solution of 120 g. of vinyl sulphonic acid anthranilide, prepared according to the instructions in J. Chem. Soc., 1945, page 465, is poured at 45° C. and at a pH value of 9 into a solution of 1 kg. of gelatine in 10 litres of water and the mixture is stirred for 2 hours. It is then neutralized and cooled.

Using the derivatives of Examples 1 to 3, it is possible for silver bromide emulsions of medium sensitivity to be prepared by two methods.

*Example 4*

Solution 1:
  1.2 litres of water
  150 g. of gelatine derivative
  87.5 g. of potassium bromide
  25 g. of sodium chloride
  0.5 g. of potassium iodide Solution 2:
  300 cc. of water
  100 g. of silver nitrate
  25 g. of ammonium nitrate
  100 cc. of ammonia (25%)

The solutions 1 and 2 are heated to 44° C. and solution 2 is incorporated by stirring into solution 1. The resulting emulsion is stirred for 30 minutes at 44° C. A solution of 160 cc. of 25% sulphuric acid and 25 cc. of 40% citric acid are then run in. The solidified emulsion thus formed is shaped into noodles and rinsed. The noodles are thereafter melted down with the addition of 50 g. of gelatine and stirred for another 60 to 80 minutes at 50° C. An emulsion operating very smoothly is obtained.

*Example 5*

The same emulsion as described in Example 4 is obtained in the following manner:

The procedure is as indicated above, but instead of the acid mixture given above 190 cc. of 25% sulphuric acid and 10 cc. of glacial acetic acid are run in, whereupon the gelatine derivative and the silver halide flocculate out. The supernatant clear liquid is separated and the coagulate washed 2 to 3 times with water. The coagulate is then dissolved in 1.5 litres of water at a temperature of 40° C. with addition of about 8 cc. of 10% sodium hydroxide solution. 50 g. of gelatine are incorporated by stirring and the emulsion is further stirred as described above. The emulsion which is obtained has the same good properties as the emulsion obtained as described in Example 4.

The viscosity of the two emulsions depends on the pH value.

In Example 1 the vinylsulfonic acid anilide may be replaced by 120 g. of vinylsulphonic acid-p-phenetidide (J. Chem. Soc., 1945, page 464), or by the same amount of vinylsulphonic acid-p-toluidide or vinylsulphonic acid-N-methylanilide (Ber. 36 (1903), page 3626; J. Chem. Soc., 1945, page 464), or vinylsulphonic acid-m-chloro-anilide (Ber. 36 (1903), page 3626).

We claim:

1. A composition consisting essentially of gelatin that has been reacted with a vinylsulfonamide having the formula:

in which R' is an aryl radical and R'' is a radical of the group consisting of hydrogen, lower alkyl, and lower alkanoyl radicals.

2. A process of preparing a composition as defined in claim 1 which comprises contacting an aqueous solution of gelatin having a pH between about 8 and about 10 at a temperature between about 35 and 55° C. with a vinylsulfonamide as defined in claim 1.

3. An emulsion consisting essentially of a silver halide dispersed in a gelatin composition as defined in claim 1.

References Cited in the file of this patent

UNITED STATES PATENTS 2,816,125  Allen et al. _____ Dec. 10, 1957

FOREIGN PATENTS 776,470  Great Britain _____ June 5, 1957

OTHER REFERENCES

Chemical Abstracts 36, pp. 699 and 4006.
Chemical Abstracts 38, pp. 5590.
Conant et al.: The Chemistry of Organic Compounds, 4th Ed. The Macmillan Co., New York, pages 138–139.